United States Patent [19]

Matsuzaki et al.

[11] 4,351,715
[45] Sep. 28, 1982

[54] APPARATUS FOR HIGH TEMPERATURE ELECTRODIALYSIS

[75] Inventors: Harumi Matsuzaki; Osamu Kuroda; Isao Okouchi, all of Hitachi; Kenkichi Izumi, Mito; Sankichi Takahashi, Hitachi, all of Japan

[73] Assignees: Hitachi, Ltd.; Babcock-Hitachi Kabushiki Kaisha, both of Tokyo, Japan

[21] Appl. No.: 239,578

[22] Filed: Mar. 2, 1981

Related U.S. Application Data

[62] Division of Ser. No. 138,975, Apr. 10, 1980, Pat. No. 4,311,575.

[30] Foreign Application Priority Data

Apr. 18, 1979 [JP] Japan .................................. 54-46640

[51] Int. Cl.³ .............................................. B01D 13/02
[52] U.S. Cl. .................................................... 204/301
[58] Field of Search ............................ 204/180 P, 301

[56] References Cited

U.S. PATENT DOCUMENTS 4,160,713 7/1979 Matsuzaki et al. ............. 204/180 P

FOREIGN PATENT DOCUMENTS 52-137153 6/1977 Japan ............................... 204/180 P Primary Examiner—Howard S. Williams
Attorney, Agent, or Firm—Thomas E. Beall, Jr.

[57] ABSTRACT

In electrodialysis of desalting or concentrating an electrolyte solution in desalting chambers and concentrating chambers constituted by alternately juxtaposing a plurality of anion and cation exchange membranes between at least a pair of electrodes by supplying the electrolyte solution into the desalting and concentrating chambers while introducing a gas in a bubble state into the electrolyte solution between the ion exchange membranes, the electrolyte solution is made to contact the gas in the bubble state while providing a temperature difference between the gas and the electrolyte solution. The scale deposition onto the ion exchange membranes is prevented with an increase in electrodialysis efficiency.

7 Claims, 5 Drawing Figures

APPARATUS FOR HIGH TEMPERATURE ELECTRODIALYSIS

The present application is a divisional application of U.S. Ser. No. 138,975, filed Apr. 10, 1980, now U.S. Pat. No. 4,311,575 for METHOD FOR HIGH TEMPERATURE ELECTRODIALYSIS.

The present invention relates to electrodialysis for desalting or concentrating an electrolyte solution by utilizing electrophoresis of ions and selective permeability of ion exchange membranes, and more particularly to a process and an apparatus for electrodialysis effectively applicable at a high temperature.

It is known from U.S. Pat. No. 4,160,713 that the thickness of a diffusion layer formed by concentration polarization is made smaller by introducing gas bubbles into the dilution chambers of an apparatus for electrodialysis than not by introducing the gas bubbles therein. It is also known from Japanese Laid-open Patent Application No. 137153/77 to heat an electrolyte solution entering into an apparatus for electrodialysis by utilizing waste heat. However, performance of electrodialysis is evaluated by (1) a rate of dialysis per unit membrane area and (2) power consumption. The evaluation factor (1) is the limit current density, which depends upon the turbulance of an electrolyte solution. The evaluation factor (2) is the electric resistance between electrodes, which depends upon the thickness of a diffusion layer at a low concentration formed near the membrance surfaces at the sides of desalting chambers, the thickness of a diffusion layer showing a degree of concentration polarization, specific resistance of a bulk layer, specific resistance of a membrane, and the degree of pollution of the membranes due to soft scales formed by depositing such suspended materials as dusts, dirt, etc. on the membrane surface, hard scales formed by depositing dissolved and ionized substances on the membrane surface, when the concentration of the substances exceeds a saturation due to an evaporation phenomenon at the interface between the electrolyte solution and the gas bubbles. Furthermore, the pollution of the membranes at the sides of the desalting chambers gives an influence upon the degree of concentration polarization.

High temperature electrodialysis is carried out at a predetermined elevated temperature of an electrolyte solution, to decrease the specific resistance and viscosity of the electrolyte solution, and easily bring the electrolyte solution into a turbulant state and greatly reduce the electric resistance between the electrodes thereby, as well as to lower the power consumption. When the electrodialysis is carried out at the electrolyte solution temperature of 60° C., the electric resistance between the electrodes can be about 40% lowered by the heating effect, as compared with that at 20° C. Furthermore, the pressure drop in the flow of the electrolyte solution between the membranes can be also lowered owing to the decrease in viscosity.

However, negative effects due to the heating also appear. For example, deposition of hard scales is promoted, and as a result troubles such as membrane pollution appear, so that these disadvantages cancel the foregoing advantages.

Generally, the saturated solution concentration of salts tends to increase with increasing temperature, but the saturated solution concentration of typical hard scales in sea water, for example, $CaSO_4$, $CaSO_4 \cdot 2H_2O$, $CaSO_4 \cdot \frac{1}{2}H_2O$, $CaCO_3$ and $Mg(OH)_2$ is not increased with increasing temperature, but tends to decrease, as shown in FIG. 1.

When the electrodialysis of sea water is carried out at an elevated temperature, scales thus deposit onto the membrane surface even at a low degree of concentration, lowering the dialysis performance and considerably shortening the life of membrane. If the electrodialysis is further continued, the dialysis chambers, and passage for the electrolyte solution are clogged by deposited scales, and the supply of the electrolyte solution becomes difficult. That is, the continued electrodialysis is impossible to carry out. Thus, it is the essential condition how to prevent the deposition of scales on the membrane surfaces in the high temperature electrodialysis of sea water for the foregoing reasons.

The present inventors have carried out extensive tests and studies to clarify the scale deposition phenomena, and have found that in the high temperature electrodialysis of an electrolyte solution having such a tendency that the saturated solution concentration tends to decrease with increasing temperature, deposition of scales onto the surfaces of ion exchange membranes can be practically prevented by introducing a gas in a bubble state into the electrolyte solution between the ion exchange membranes, the gas having a temperature difference from the electrolyte solution, and thereby effecting evaporation of the liquid at interfaces between the liquid and the gas bubbles, and that the efficiency of electrodialysis can be also improved thereby. The present invention has been established on the basis of such findings.

An object of the present invention is to provide a process and apparatus for high temperature electrodialysis capable of substantially preventing deposition of scales onto the surfaces of ion exchange membranes when an electrolyte solution is electrodialyzed at a high temperature with the ion exchange membranes, thereby realizing a remarkable heating effect.

Another object of the present invention is to provide a process and an apparatus relating to a heating means when an electrolyte solution is electrodialyzed at a high temperature.

The present invention provides a process and an apparatus for high temperature electrodialysis, where an electrolyte solution is concentrated or desalted through electrodialysis in desalting chambers and concentrating chambers constituted by alternately juxtaposing a plurality of anion and cation exchange membranes between at least a pair of electrodes by supplying the electrolyte solution into the desalting and concentrating chambers while introducing a gas in a bubble state into the electrolyte solution between the ion exchange membranes, characterized by making the electrolyte solution contact the gas in the bubble state while providing a temperature difference between the gas and the electrolyte solution.

According to the present invention, the following two methods are applicable to providing the temperature difference between the electrolyte solution and the gas in the bubble state introduced into between the ion exchange membranes.

(1) Temperature of the electrolyte solution is made higher than that of the gas, and the gas is introduced in the bubble state into the electrolyte solution to effect gas-liquid contact.

(2) Temperature of the gas is made higher by heating than that of the electrolyte solution, and the gas is introduced in the bubble state into the electrolyte solution to effect gas-liquid contact.

The gist of the present invention based on the above-mentioned structure is to prevent deposition of scales onto the surfaces of ion exchange membranes by making the electrolyte solution between the ion exchange membranes have the highest concentration at the position other than those along the surfaces of membranes, that is, at the intermediate position between the ion exchange membranes, thereby allowing the scales to precipitate at the intermediate position, and transporting the precipitated scales together with the ascending gas bubbles.

This action will be described in detail below, referring to the accompanying drawings.

Figure 1:
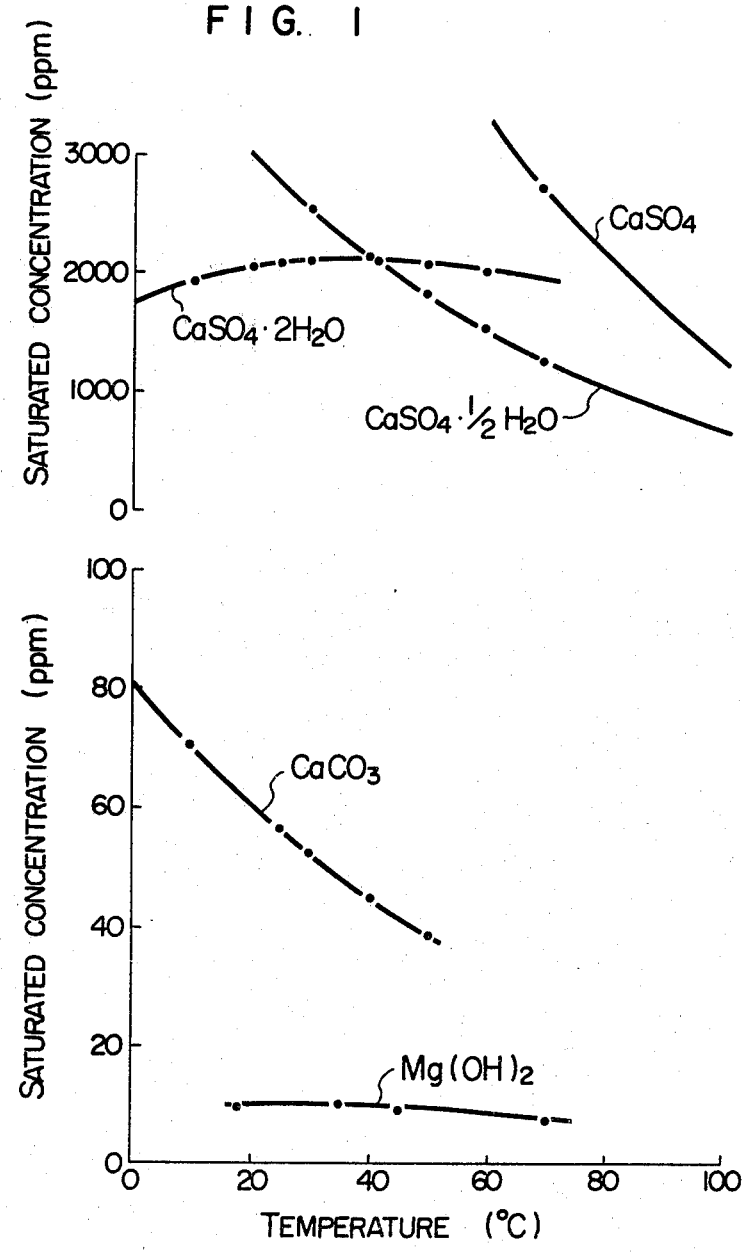
FIG. 1 is a diagram showing relationships between saturation solubility of typical hard scale components in sea water and temperature.
Figure 2:
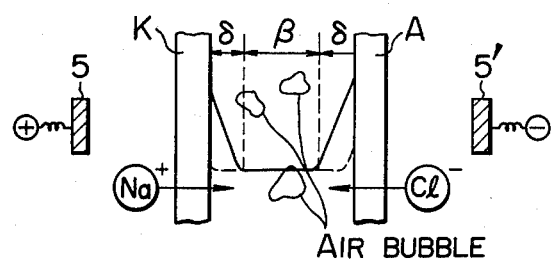
FIG. 2 is a schematic view showing a concentration distribution in a concentrating chamber at the electrodialysis.
Figure 5:
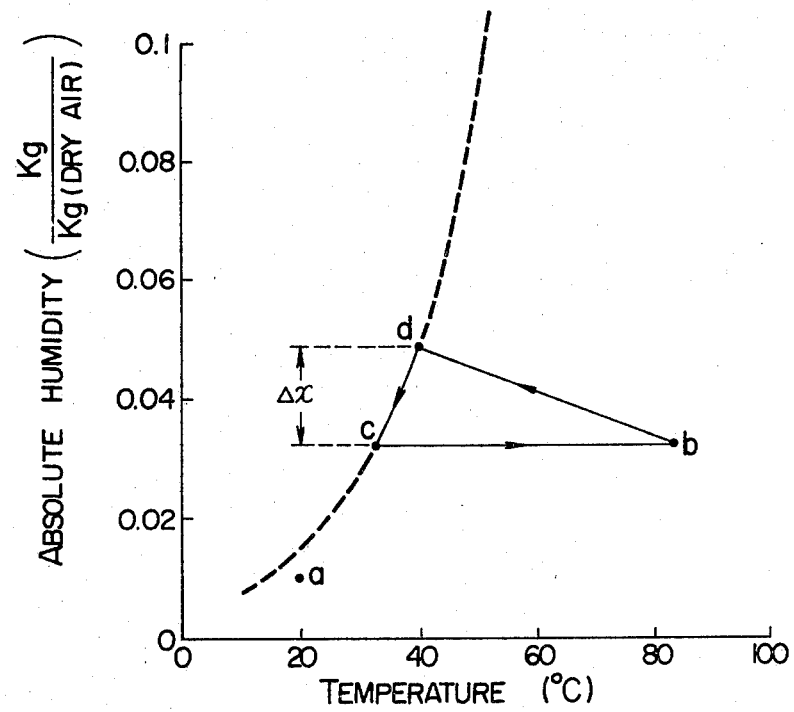

FIG. 5 is a diagram illustrating a change in the state of air to be introduced in the operation according to Example 2 of the present invention In FIG. 2, a concentration distribution in a concentrating chamber at electrodialysis is shown. When electric current is passed between electrodes 5 and 5', ions move toward a concentrating chamber by electrophoresis of ions and selective permeability of ion exchange membranes. The electrophoresis of ions means movement of ions having a minus charge (for example, $Cl^-$) toward a plus electrode and movement of ions having a plus charge (for example, $Na^+$) toward a minus electrode. The selective permeability of ion exchange membrane means such a property that an anion exchange membrane A is permeable only by anions, and a cation exchange membrane K only by cations. Thus, the ions permeate through the ion exchange membranes and move into the concentrating chamber, whereby a very high concentration is distributed near the surfaces of the membranes. The phenomenon that a high concentration prevails near the surfaces of the membranes (while a low concentration prevails near the surfaces of the membranes in a desalting chamber) is called "concentration polarization". In the concentration distribution shown in FIG. 2, portions having a concentration gradient is called "diffusion layer ($\delta$)", while a portion having no concentration gradient "bulk layer ($\beta$)". The degree of concentration polarization can be evaluated by the thickness of the diffusion layer ($\delta$).

According to the present invention, the following three actions of gas bubbles are utilized simultaneously.

(1) The gas bubble vigorously agitates the electrolyte solution between the ion exchange membranes, thereby reducing the thickness of diffusion layer ($\delta$), and thus the concentration at the surfaces of membranes is decreased. A difference between the concentration at the surfaces of membranes and the concentration at the bulk layer can be reduced to 1/5–1/6 at the gas bubbling, as compared with the case at no gas bubbling.

(2) The electrolyte solution undergoes evaporation at the boundary surfaces between the gas bubbles and the electrolyte solution, whereby the electrolyte solution is concentrated near the boundary surfaces therebetween to make the concentration there higher than at the surfaces of membranes, and consequently scales precipitate near the boundary surfaces.

(3) The scales precipitated at the boundary surfaces between the gas bubbles and the electrolyte solution are prevented from deposition onto the surfaces of membranes by washing action due to the agitation of the electrolyte solution by the gas bubbles. The washing action by the gas bubbles for the surfaces of membranes is not effective for the scales deposited on the surfaces of membranes, but very effective for preventing the materials suspended in the electrolyte solution from deposition or settling onto the surfaces of membranes, etc., and also for transporting and discharging them together with the gas bubbles.

In the present invention, hard scales can be prevented from deposition onto the surfaces of membranes by the simultaneous occurrence of said three actions of the gas bubbles with a temperature difference between the gas and the electrolyte solution, and electrodialysis can be carried out with a good stability.

The present invention will be described in detail below, referring to one embodiment of using an electrolyte solution at a high temperature and another embodiment of using a gas at a high temperature as a means for providing a temperature difference between the electrolyte solution and the gas to be introduced in a bubble state according to the present invention.

EXAMPLE 1

Figure 3:
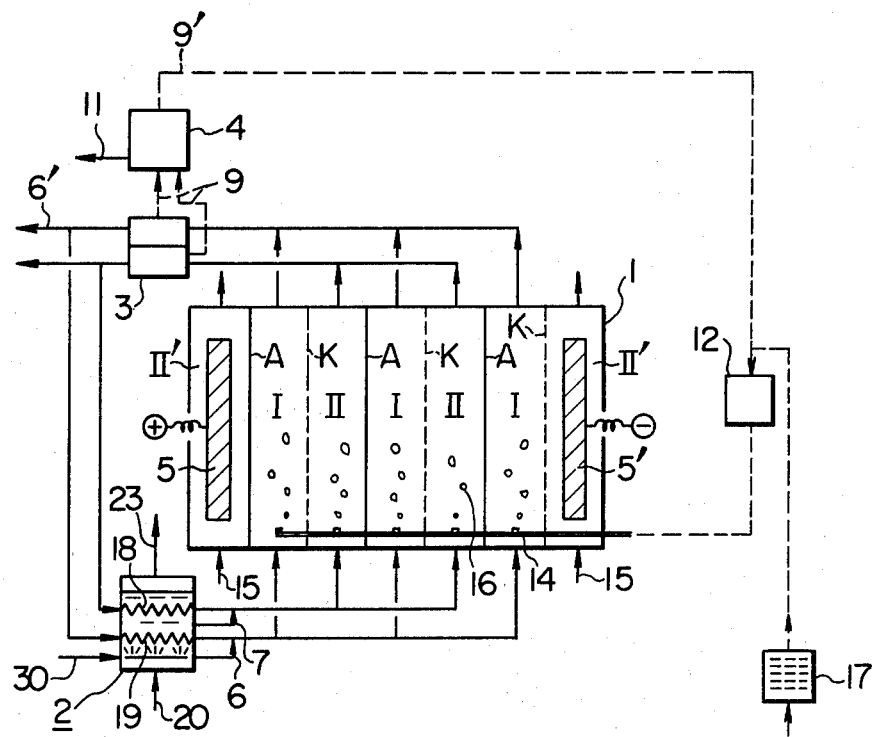
FIG. 3 is a schematic flow diagram showing one embodiment of the present invention, which is operated while making the temperature of an electrolyte solution higher than that of a gas to be introduced in a bubble state.

In FIG. 3, a schematic flow diagram of one embodiment of using an electrolyte solution at a higher temperature than that of a gas to be introduced therein in a bubble state and making the electrolyte solution contact the gas bubbles according to the method (1) is shown.

Electrodialysis cell 1 is comprised of desalting chambers I and concentrating chambers II, constituted by alternately juxtaposing anion exchange membranes A and cation exchange membranes K between anode 5 and cathode 5', and gas supply device 14 is provided at the lower parts of desalting chambers I and concentrating chambers II. Compartments II' having electrodes 5 and 5' and electrode liquid 15 are called electrode chambers. Solution to be desalted 6 and solution to be concentrated 7 are individually heated to a predetermined temperature in heat-exchange type heater 2 and distributed into desalting chamber I and concentrating chamber II, respectively, of electrodialysis cell. Gas 9' is introduced in dialysis chambers I and II that is, desalting chambers I and concentrating chambers II, respectively) through gas supply device 14. Solution to be desalted 6 and solution to be concentrated 7 are electrodialyzed in electrodialysis chambers I and II, whereby the solution to be desalted undergoes a decrease in salt concentration, whereas the solution to be concentrated undergoes an increase in salt concentration. The solutions then flow out of dialysis chambers I and II.

Gas 9' are introduced through dehumidifying means 12 into dialysis chambers I and II at the lower parts thereof as gas bubbles 16 by gas supply device 14 provided with nozzles for dispersing the gas bubbles. The gas agitates the electrolyte solution at a high temperature therein, thereby decreasing the degree of concentration polarization appearing near the surfaces of membranes and substantially elimiating the difference between the concentration at the surfaces of membranes and the concentration at the bulk layer. Evaporation of the electrolyte solution is carried out at the boundary surfaces between the gas bubbles and the electrolyte solution by the contact of the electrolyte solution with gas bubbles 16, and the concentration of electrolyte solution is made higher at the boundary surfaces between the gas bubbles and the electrolyte solution than at other parts by taking the generated vapor into gas bubbles 16, whereby scales are made to precipitate at the boundary surfaces. The resulting white turbid electrolyte solution is made to flow out of the dialysis chambers together with the gas bubbles.

The desalted solution and concentrated solution containing the gas bubbles from dialysis chambers I and II are subjected to separation and release of wet gas 9, respectively, in gas-liquid separator 3, and recycled to the respective dialysis chambers, and electrodialyzed. On the other hand, wet gas 9 undergoes condensation in condenser 4, whereby water vapor in the gas is condensed as condensate 11 (fresh water), which can be mixed with desalted water 6' or can be withdrawn separately as fresh water. Saturated wet gas 9' freed from water is recycled into the solution to be desalted and the solution to be concentrated through dehumidifying device 12 and gas supply device 14 with nozzles for dispersing the gas as gas bubbles.

The present embodiment can provide an apparatus for desalting sea water, that is, fresh water production or salt production. Sea water treatment will be described below according to FIG. 3.

Solution to be desalted 6 and solution to be concentrated 7, for which sea water serves as a feed solution, are heated by utilizing solar heat or warm sea water used for cooling in a fuel-fired power plant, etc., or by utilizing solar heat in daytime and burning natural gas as fuel in cloudy or rainy daytime and night in the tropical petroleum production countries. The heating mechanism of the present embodiment, which ensures a continuous operation, comprises heat-exchange type heater 2 encasing feed sea water 20, provided with heat transfer tubular sections 18 and 19 for heating the desalted solution and the concentrated solution, respectively, which have been freed from wet gas 9 in gas-liquid separator 3 and are recycled for electrodialysis. Solution to be desalted 6 and solution to be concentrated 7 can be made to have a high temperature by directly blowing, for example, combustion flue gas 30 into the feed sea water in heat-exchange type heater 2, thereby obtaining feed sea water at a high temperature.

The combustion flue gas blown into the feed sea water is discharged to the atmosphere through conduit 23. The effluent combustion flue gas contains water vapor, and thus can be introduced to condenser 4 by communicating conduit 23 with condenser 4, where the water vapor in the effluent combustion flue gas can be removed as condensate fresh water, and the gas can be recycled as gas 9'.

Suitable bubbling gas is air, nitrogen, etc., and can be supplied for electrodialysis after dust removal by filter 17.

As described in the above embodiment, gas bubbles are introduced into an electrolyte solution having a higher temperature than that of the gas bubbles in the electrodialysis for concentrating or desalting the electrolyte solution by supplying the electrolyte solution into desalting chambers and concentrating chambers of an electrodialysis cell, the desalting chambers and the concentrating chambers being constituted by alternately juxtaposing a plurality of anion exchange membranes and cation exchange membranes between at least a pair of electrodes, and the electrolyte solution is made to have the higher temperature by heating through the heating mechanism comprising a heat-exchange type heater encasing untreated (feed) solutions to be desalted and concentrated, provided with heat transfer tubular sections for recycling desalted and concentrated solutions, respectively, from the electrodialysis cell after being freed from the gas contained in the solutions.

Test results according to the present embodiment are shown in Table 1.

| Specification of test electrodialysis cell: | |
|---|---|
| Anion and cation exchange membranes: | 3 pairs |
| Membrane area: | 21.3 dm$^2$/sheet |
| Membrane distance: | 4 mm |
| Electrolyte solution: | Sea water containing 2,000 ppm of gypsum |
| Gas to be introduced: | Air (20° C., R.H 70%) |
| Operating time: | 4 hours (more than 3 hours after no change is observed in concentration) |
| Introduced gas flow velocity (as superficial gas velocity): | 3 cm/sec. |

TABLE 1

| No. | Electrolyte solution temperature (°C.) | Deposition on membrane surface | White turbidity of electrolyte solution | Effect |
|---|---|---|---|---|
| 1 | 20 | Yes (entire surface) | None | Poor |
| 2 | 30 | Yes (partially) | Yes | Rather good |
| 3 | 40 | None | Yes | Good |
| 4 | 50 | None | Yes | Good |
| 5 | 60 | None | Yes | Good |

As is evident from the foregoing tests, gypsum scales are deposited onto the entire surfaces of membranes from the electrolyte solution at 20° C., the electrolyte solution undergoes no formation of white turbidity, and the effect is hardly expectable. Deposition of scales from the electrolyte solution at 30° C. only onto the corner surfaces of membranes in the electrodialysis chambers is observable, but no deposition of the scales is observable at other parts of the surfaces of membranes, and the electrolyte solution turns white turbid, where it seems that the effect cannot be attained at the stagnant parts of flow due to the structure of electrodialysis chambers. No substantial deposition of scales onto the surfaces of membranes is observable at 40° to 60° C. when air having the ordinary humidity at the ordinary temperature (20° C.) is used for gas bubbles, the electrolyte solution must have a temperature difference of at least 10° C. from that of the air. That is, the temperature of electrolyte solution must be at least 30° C. for the gas to be introduced at 20° C., but an influence of high temperature upon the properties and life of ion exchange membrane must be taken into account.

High temperature electrodialysis according to the present embodiment where the temperature of electrolyte solution is made higher than that of gas before supplying it to the electrodialysis cell in providing a temperature difference between the electrolyte solution and the gas is economically effectively applicable to sea water, etc. in the tropical countries where solar heat can be readily utilized.

It has been experimentally clarified that deposition scales onto the gas-dispersing nozzle parts through which the gas is introduced in a bubble state into the electrolyte solution readily takes place when the temperature of gas to be introduced is lower, and the temperature of the electrolyte solution near the nozzle parts is higher, and that the deposition of scales becomes less when the temperature of the gas to be introduced approaches a saturation temperature. Thus, the trouble of the gas-dispersing means for introducing the gas can be readily overcome by a simple means corresponding to the electrodialysis apparatus, for example, by using vibration nozzles, or by an adjustable temperature and humidity mechanism.

EXAMPLE 2

Figure 4:
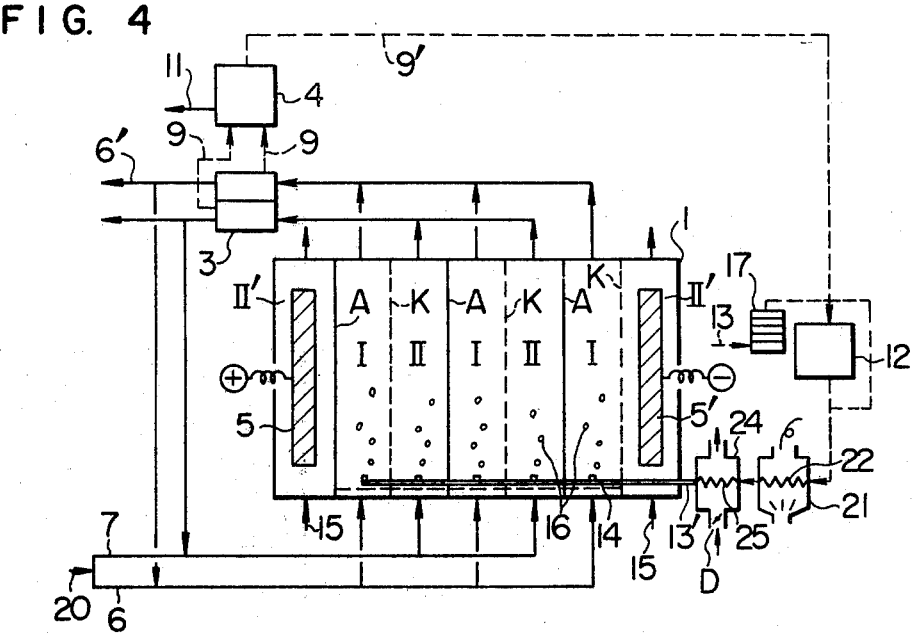
FIG. 4 is another schematic flow diagram showing one embodiment of the present invention, which is operated while making the temperature of a gas to be introduced in a bubble state higher by heating than that of an electrolyte solution.

In FIG. 4, a schematic flow diagram showing another embodiment of heating a gas to a higher temperature than that of the electrolyte solution and introducing the heated gas in a bubble state into the electrolyte solution according to the method (2) is given.

In the present embodiment, electrodialysis cell 1, gas-liquid separator 3, condenser 4, etc., which are identical with those of Example 1, are used, except that structure and function of members relating to the means for introducing the gas are different from those of Example 1. Thus, explanation of the common members in the electrodialysis apparatus therebetween are not made in the following description to avoid duplication.

The present embodiment is likewise suitable to desalting of sea water as in Example 1, and thus explanation will be made, referring to sea water treatment as an example.

The present embodiment provides an electrodialysis apparatus suitable for the regions where it is not easy to utilize the solar heat, etc. The means for continuously heating a large amount of sea water by combustion of fuel is economically not applicable to the mild or cold climate regions, except the volcanic regions near sea shores where volcanic heat can be utilized. For example, even in the simple means or directly blowing a hot gas into the sea water, as given in Example 1, deposition and settlement of hard scales in the heat-exchange type heater are not avoidable, though in a small amount, and thus the heat-exchange type heater as a continuously operating means still has some problem in this sense. The present embodiment can eliminate such scale deposition by using a means for heating a gas to be introduced into the electrolyte solution and can effectively attain the desired objects of the present invention.

Solution to be desalted 6 and solution to be concentrated 7, for which sea water serves as feed electrolyte solution 20, are introduced into electrodialysis cell 1 through the same routes as for the desalted solution and the concentrated solution from gas-liquid separator 3. Saturated wet gas 9', which has been led to condenser 4 from gas-liquid separator 3 and freed from condensed fresh water, is passed through dehuminidifying means 12 and heated to a high temperature through heat transfer tubular section 22 of heater 21. Then, the heated gas is passed through heat transfer tubular section 25 of temperature-adjusting device 24 and introduced in a bubble state into desalting chambers I and concentrating chambers II of electrodialysis cell 1 by dispersion through a gas-dispersing means of gas supply device 14. The gas bubbles heated to the high temperature stir the electrolyte solutions between the ion exchange membranes, thereby reducing the degree of concentration polarization appearing near the surfaces of membranes and substantially eliminating the difference between the concentration at the surfaces of membranes and that at the bulk layer.

Evaporation of electrolyte solution is carried out at the boundary surfaces between the gas bubbles and the electrolyte solution through contact of the gas bubbles 16 at the high temperature with the electrolyte solution, and the concentration of electrolyte solution is made higher near the boundary surfaces between the gas bubbles and the electrolyte solution than at other parts so as to make the gas bubbles 16 contain the resulting vapor, and deposit scales at the boundary surfaces, and the resulting white turbid electrolyte solution is discharged from the electrodialysis chambers together with the gas bubbles. Then, the electrolyte solution is treated in gas-liquid separator 3 and condenser 4 in the same manner as in Example 1. The resulting saturated wet gas 9' is recyclically used.

In the present embodiment, the gas heated to a high temperature in heater 21 is adjusted to an appropriate temperature by air cooling in temperature-adjusting device 24, since the gas at too high a temperature will damage the ion exchange membranes. The temperature adjustment is carried out by detecting temperatures at the lower parts of desalting chambers I and concentrating chambers II, and adjusting the degree of opening of damper D at temperature-adjusting device 24 interlocking heater 21.

In the present embodiment, suitable gas 13 for bubbling is air, nitrogen, etc., and is supplied to the electrodialysis cell after dust removal through filter 17.

In FIG. 5, a diagram illustrating changes in the state of a gas (air) is given. The lower the humidity of a high temperature gas to be introduced into the electrolyte solution, the better the evaporation efficiency at the boundary surfaces between the gas bubbles and the electrolyte solution through the contact of the gas bubbles with the electrolyte solution. FIG. 5 illustrates the operation according to the embodiment of FIG. 4, where humidifying device is bypassed.

Dotted curve in FIG. 5 is a curve of saturated wet air under the atmospheric pressure of 760 mm Hg, and operating lines show the case of stationary state (b-d-c) where the air having a given humidity at 84° C. (point b) is introduced into an electrolyte solution at 20° C., and the temperature of the electrolyte solution reaches 40° C. (point d) as a result of heat exchange between the high temperature air and the electrolyte solution through their contact. Explanation will be made below of the case, referring to the reference numerals in the embodiment of FIG. 4. Air 13 corresponds to point a in FIG. 5, where the relative humidity is about 70%. Air 13 is heated to 84° C. through heater 21 and temperature-adjusting device 24, and it becomes air 13' (point b). Air 13' is then introduced into the electrolyte solution, and heat exchange and evaporation of the electrolyte solution take place at the boundary surface between the gas bubbles and the electrolyte solution, whereby the state of air is shifted from point b at 84° C. to point d at 40° C. Wet air 9 corresponds to point d and is in a saturated wet state. Then, water condensate is removed from the wet air in condenser 4, and saturated wet air 9' at 33° C. is obtained, corresponding to point c. The path from point d to point c means a condensation process. Saturated wet air 9' is heated again to the predetermined temperature in heater 21, whereby unsaturated air 13' at the high temperature, corresponding to point b is obtained again. Then, operation is repeated in the cycle of b-d-c. The amount of evaporated electrolyte solution at the boundary surfaces between the gas bubbles and the electrolyte solution is $\Delta x$, which depends upon the temperature of an electrolyte solution in a stationary state, and the humidity and temperature of gas to be introduced.

Tests were carried out with air having a relative humidity of 70% at varied temperatures between 40° and 100° C. as a gas to be introduced into the electrolyte solution, and the electrolyte solution at the initial temperature of 20° C. and the stationary temperature of 30° C. under the following conditions. Results are given in Table 2.

| Specification of test electrodialysis cell | |
|---|---|
| Anion and cation exchange membranes: | 3 pairs |
| Membrane area: | 21.3 dm²/sheet |
| Membrane distance: | 4 mm |
| Electrolyte solution: | Sea water containing 2,000 ppm of gypsum |
| Gas to be introduced: | Air (R.H: 70%) |
| Operating time: | 4 hours (more than 3 hours after no change is observed in concentration) |
| Introduced gas flow velocity: | 3 cm/sec (as superficial gas velosity) |

TABLE 2

| No. | Introduced gas temperature (°C.) | Deposition on membrane surface | White turbidity of electrolyte solution | Effect |
|---|---|---|---|---|
| 1 | 50 | Yes | None | Poor |
| 2 | 60 | Yes | None | Poor |
| 3 | 70 | Yes | None | Poor |
| 4 | 80 | Substantially none | Yes | Good |
| 5 | 90 | Substantially none | Yes | Good |
| 6 | 100 | Substantially none | Yes | Good |

Below the introduced gas temperature of 70° C., scales are deposited on the surfaces of membranes, and the effect is poor, whereas above 80° C., no substantial deposition of scales onto the surfaces of membranes take place except the stagnant parts of flow, and the good effect is obtained.

In the present embodiment of heating the gas to a high temperature, the gas temperature must be adjusted before the contact of the gas with the ion exchange membranes in view of the properties and life of the ion exchange membranes, as described before in Example 2.

As described above, the embodiment of Example 2 according to the present invention is characterized by heating the gas to a higher temperature than that of the electrolyte solution to provide a temperature difference between the gas to be introduced and the electrolyte solution, and this is the difference from the embodiment of Example 1, and a mechanism for heating the gas to a high temperature according to the present invention comprises a heater for heating the gas separated from the effluent electrolyte solution from the electrodialysis cell and freed from fresh water condensate, a temperature adjusting device of adjusting the temperature of the heated gas to an appropriate temperature, and a conduit of recycling the gas in a high temperature gas bubble state into the desalting chambers and the concentrating chambers of the electrodialysis cell.

In the embodiment of Example 2; it is not necessary to take into consideration the troubles due to the deposition and settlement of scales in the heater since the gas is heated to a high temperature, quite differently from the heating of the electrolyte solution, and furthermore a temperature-adjusting means is provided for adjusting the heated gas to an appropriate temperature, and thus efficient operation of the electrodialysis cell can be carried out without any adverse effect of high temperature upon the properties and life of ion exchange membranes. In the electrodialysis of sea water, the present embodiment of heating the gas to be introduced into the electrolyte solution is economically advantageous in the warm or cold climinate regions where the utilization of solar heat is not expected.

Test results of the present invention according to Examples 1 and 2, using ion exchange membranes are shown in Table 3, where the effect of temperature difference upon the prevention of concentration polarization and scale deposition is shown in terms of a ratio of electric resistance to that at the electrodialysis of sea water at 20° C. as the standard.

TABLE 3

| (Example 1) | | |
|---|---|---|
| Air bubbling | Electrolyte solution temperature (°C.) | Electric resistance ratio |
| None | 20–30 | 0.9–1 |
| Yes | 20 | 0.6–0.7 |
| " | 30 | 0.6 |
| " | 40 | 0.5 |
| " | 50 | 0.44 |
| " | 60 | 0.4 |
| " | 70 | 0.38 |

Remark: Introduced air temperature: 20° C.

| (Example 2) | | |
|---|---|---|
| Air Bubbling | Introduced air temperature (°C.) | Electric resistance ratio |
| Yes | 50 | 0.6–0.7 |
| " | 60 | 0.6–0.7 |
| " | 70 | 0.6 |
| " | 80 | 0.5 |
| " | 90 | 0.44 |
| " | 100 | 0.4 |

Remark: Electrolyte solution temperature: 20° C.

As is evident from the foregoing, the electrodialysis of an electrolyte solution can be carried out at a high temperature by gas bubbling while providing a temperature difference between the gas bubbles and the electrolyte solution with a reduced electric resistance, for example, one-half or less of that when no gas bubbling is carried out at 20° C. and without any damage to the ion exchange membranes.

That is, not only the reduction in power consumption, but also an increase in operating current density as well as operating efficiency can be obtained according to the present invention. When the present process for high temperature electrodialysis is carried out in the present apparatus, a remarkable effect can be obtained particularly in the electrodialysis of sea water.

What is claimed is:

1. An apparatus for electrodialysis for desalting or concentrating an electrolyte solution comprising:
at least a pair of electrodes immersed in the electrolyte solution;
a plurality of separate anion and cation ion exchange membranes alternately juxtaposed between the pair of electrodes and immersed in the electrolyte solution, thereby forming alternate juxtaposed desalting chambers and concentrating chambers;
gas supply means for dispersing a gas in a bubble state into the chambers through the electrolyte solution between the ion exchange membranes, thereby making the gas contact the electrolyte solution;
heater means for heating at least one of the electrolyte solution and the gas being provided, thereby providing a temperature difference between the gas and the electrolyte solution, said heater means being separate from and in addition to said electrodes; and
condenser means for condensing vapor in the gas after the contact of the gas and the electrolyte solution, thereby obtaining a condensate from the gas.

2. An apparatus according to claim 1, including conduit means for recycling the gas from the contact between the gas and the electrolyte solution back to said gas supply means, thereby providing the temperature difference between the gas and the electrolyte solution; and
said heater means being within said conduit means.

3. An apparatus according to claim 1, including an electrolyte solution conduit in fluid communication with said chambers, and the heater means adapted to directly blow a heated gas into the electrolyte solution within the electrolyte solution conduit, thereby providing the temperature difference between the gas and the electrolyte solution.

4. An apparatus according to claim 1, wherein the heater means comprises a temperature-adjusting device for adjusting the temperature of the gas to an appropriate temperature for the ion exchange membranes such that the maximum temperature of the gas and solution is below a fixed temperature, thereby providing the temperature difference between the gas and the electrolyte solution.

5. Apparatus according to claim 1, including conduit means for recycling the gas, from the contact between the gas and the electrolyte solution back to said gas supply means.

6. An apparatus for electrodialysis according to claim 1, wherein the gas in a bubble state is used recyclically comprising:
gas heater means to heat the gas before it is dispersed into the electrolyte;
temperature adjusting means to adjust the temperature of the gas before it is dispersed into the electrolyte;
gas-liquid separation means to separate the gas from the electrolyte;
vapor condensing means to condense the vapor in the gas and remove the condensed vapor from the gas after it has been separated from the electrolyte;
dehumidifying means to dehumidify the gas after the vapor has been separated; and
means returning the dehumidified gas to the gas heater.

7. An apparatus according to claims 1, 2, 3, 4 or 6, including means for detecting the temperature of the solution within the desalting chambers, means for detecting the temperature of the solution within the concentrating chambers, and means responsive to said means for detecting to adjust said heater means to maintain the temperature difference between the gas and the electrolyte solution at at least 10° C.

* * * * *